June 5, 1962 W. F. SCHEEL 3,037,818
NON-DRIVE AXLE ASSEMBLY
Filed Feb. 7, 1957 7 Sheets-Sheet 1

INVENTOR
WALTHER F. SCHEEL
BY
ATTORNEYS

June 5, 1962 W. F. SCHEEL 3,037,818
NON-DRIVE AXLE ASSEMBLY
Filed Feb. 7, 1957 7 Sheets-Sheet 2

INVENTOR
WALTHER F. SCHEEL

BY Strauch, Nolan & Neale

ATTORNEYS

June 5, 1962 W. F. SCHEEL 3,037,818
NON-DRIVE AXLE ASSEMBLY
Filed Feb. 7, 1957 7 Sheets-Sheet 3

INVENTOR
WALTHER F. SCHEEL
BY
Strauch, Nolan & Neale
ATTORNEYS

June 5, 1962   W. F. SCHEEL   3,037,818
NON-DRIVE AXLE ASSEMBLY
Filed Feb. 7, 1957   7 Sheets-Sheet 4

Fig-8

INVENTOR
WALTHER F. SCHEEL

BY Strauch, Nolan & Neale
ATTORNEYS

June 5, 1962 W. F. SCHEEL 3,037,818
NON-DRIVE AXLE ASSEMBLY
Filed Feb. 7, 1957 7 Sheets-Sheet 5

Fig-9

INVENTOR
WALTHER F. SCHEEL

BY Strauch, Nolan & Neale

ATTORNEYS

United States Patent Office 3,037,818
Patented June 5, 1962

3,037,818
NON-DRIVE AXLE ASSEMBLY
Walther F. Scheel, Detroit, Mich., assignor to Rockwell-Standard Corporation, a corporation of Pennsylvania
Filed Feb. 7, 1957, Ser. No. 638,774
2 Claims. (Cl. 301—124)

This invention relates to improvements in axles, and a method and apparatus for making the axles. It has particular reference to a tubular trailer axle assembly of strong yet lightweight construction.

Tubular trailer axles which present a design light in weight, to lessen vehicle unsprung weight, and with a large degree of rigidity providing high resistance to bending in any direction are being widely accepted and used in the trucking field. Ruggedness, minimum weight, proper camber and maximum rigidity are desired qualities for trailer axles. Ruggedness is required to withstand the hard use and abusive operational hazards to which trucking trailers are subjected. Great axle rigidity is needed to carry vehicle loads and to resist the torsional twisting which results during severe braking. Decreased weight in any part of a trailer permits an increase in payload.

The present invention provides a lightened tubular trailer axle with the above desired features in an all electrically welded, one piece tubular trailer axle unit having a greatly lightened through pierced spindle forging butt welded to each end of a seamless tubular axle center section and with spring seats, diaphragm supports, cam shaft supports and brake spiders all welded to the axle unit. The production cost of the axle of the invention disclosed herein is lower than equivalent strength axles using the old methods of making spindles and assembling, and the weight of each axle is considerably less. For example, in one series of trailer axles the axle of this invention is 140 pounds lighter than an equivalent size and strength axle made according to previous methods. In a tandem trailer axle assembly this savings would amount to 280 pounds.

Accordingly a primary object of this invention resides in providing a new improved strength and lightweight tubular trailer axle assembly.

Another object resides in the provision of a completely welded tubular trailer axle assembly.

A further object resides in the provision of forged, pierced and extruded axle spindles which are butt welded to the ends of a tubular axle center section.

A still further object resides in providing novel lightweight combined spindle flanges and brake spiders which are welded to the axle assembly.

Still another object resides in the provision of novel apparatus for piercing and extruding the rough axle spindle forgings.

Still another object resides in a novel piercing assembly wherein a guide bushing is slidably disposed on the shank of a piercing punch.

A further object resides in providing a novel method for piercing and extruding axle spindles from rough axle spindle forgings.

A still further object resides in the provision of a novel method of making a tubular lightweight non-driving axle assembly including the through piercing and machining of spindle end forgings.

Further novel features and other objects of this invention will become apparent from the following detailed description, discussion and the appended claims taken in conjunction with the accompanying drawings showing preferred structures and embodiments, in which:

Figures 1, 5:
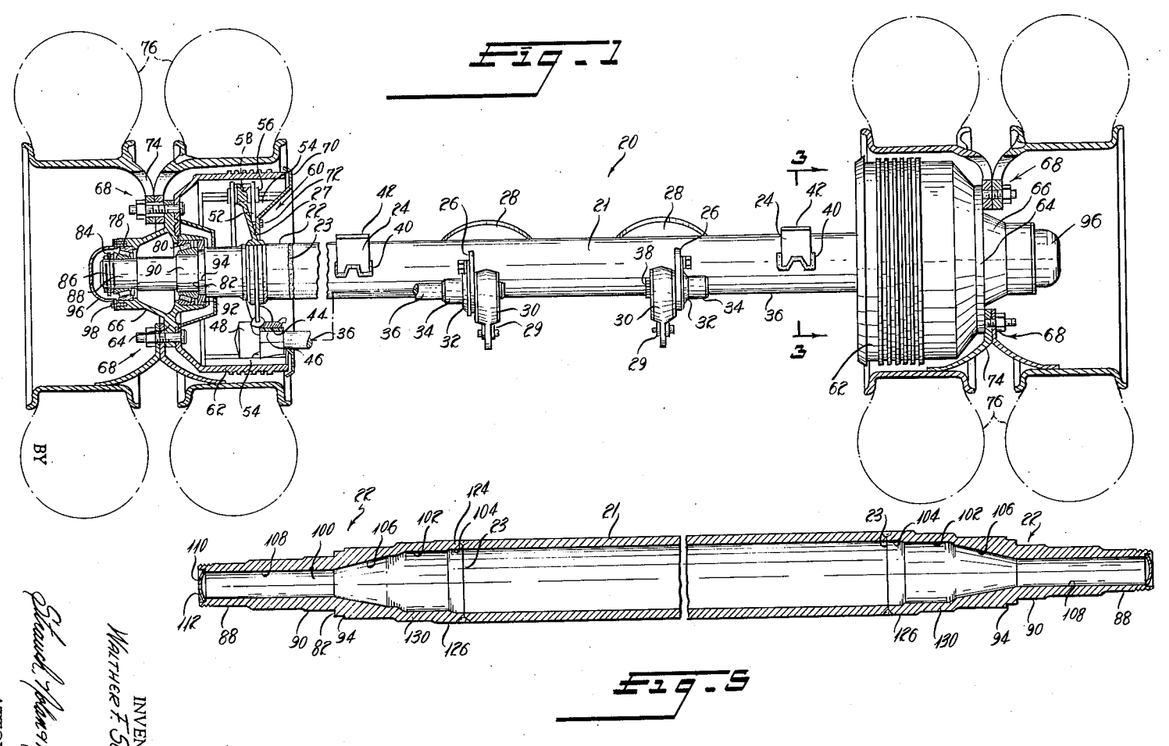
FIGURE 1 is a front elevation partially broken away and in section showing a tubular trailer axle according to a preferred embodiment of the invention, the left hand wheel being rotated away from its pure position for illustrative purposes.
FIGURE 5 is an end to end section of the axle illustrating the seamless tubular center portion with pierced end spindles.
Figure 2:
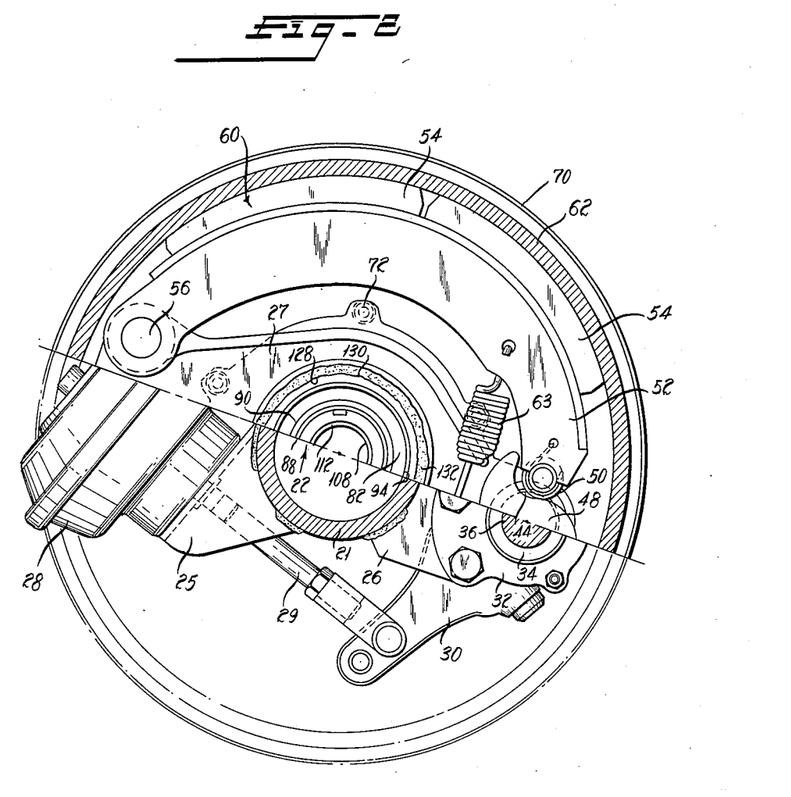
FIGURE 2 is an enlarged end view, partially broken away and in section, of the axle assembly of FIGURE 1, particularly showing the brake structure and supports for the actuating mechanism.
Figure 3:
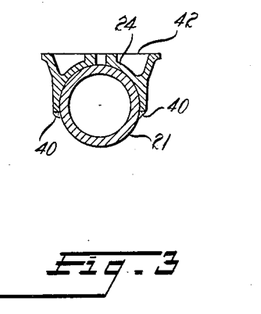
FIGURE 3 is a section along line 3—3 in FIGURE 1 showing the spring seat.

With reference to the drawings, FIGURES 1–3 illustrate a tubular trailer axle assembly 20 according to a preferred embodiment of this invention. Axle assembly 20 includes a seamless tubular center section 21 with through pierced spindle members 22 butt welded at 23 to each end. Spring seats 24, brake motor diaphragm supports 25 and brake cam actuating shaft supports 26 are also welded to the tubular axle center section 21. Brake spiders 27 are welded to each spindle member 22. The assembled result is an all-welded one-piece tubular trailer axle unit consisting of the tubular center section 21, the spindles 22, spring seats 24, diaphragm supports 25, cam shaft supports 26 and brake spiders 27.

Figure 4:
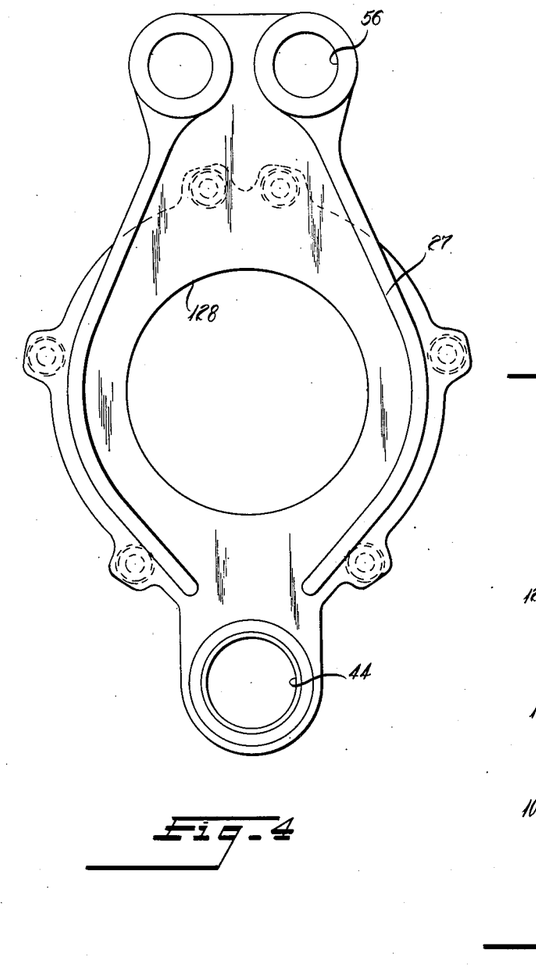
FIGURE 4 is an enlarged end elevation illustrating details of the brake spider.

Each diaphragm support 25 mounts an air motor 28 to the rear of center section 21, the diaphragm actuated rod 29 projecting forward and down to a pivotal connection with a crank arm 30 of the brake actuating mechanism. The lefthand and righthand diaphragm motors, brakes and wheels are similar, so that only the left portion of the axle shown in FIGURE 1 will be described in detail and identical reference characters will be used to identify similar parts of the right portion of FIGURE 1. The camshaft support 26, which is welded on the front side of the unit mounts a self aligning camshaft bracket 32. Bracket 32 contains a self-aligning nylon camshaft bushing 34 which supports the inner end of brake actuating camshaft 36. Crank arm 30 is suitably non-rotatably secured on the inner end of the camshaft 36. Each spring seat 24 is positioned and welded 40 to axle center section 21 so as to present a flat spring engaging surface 42 at the top of the axle assembly. Brake spider 27, FIGURES 1, 2 and 4, a one-piece combined brake spider and spindle flange, is accurately located on and welded to the respective spindles 22 and has a support opening 44 which mounts a camshaft bushing 46 and supports camshaft 36 axially inward from the brake cam actuating head 48.

The brake cam actuating head 48 is a double cam which engages roller 50 mounted in opposed ends of the shoe webs 52 of brake shoes 54 and the opposite ends of shoes 54 are pivotally secured to spider 27 by anchor pins 56 which are mounted in spider openings 58. Brake shoes 54 of each brake assembly 60 are pivoted about their respective anchor pins 56 by actuating rotation of the associated camshaft 36 and cam actuating head 48 to engage an associated brake drum 62. Deactuated brake shoe condition is obtained by a spring 63 connected between the webs 52 of brake shoes 54. Brake drum 62 is mounted on the flange 64 of a wheel hub 66 by bolt, stud and nut assemblies 68 and a brake mechanism dust shield 70, of a suitable material such as laminated fiber glass, is fastened to the inner side of brake spider 27 as by bolts 72.

Dual wheel and rim assemblies 74 for dual tires 76 are fastened to the flanges 64 of respective wheel hubs 66 by the same bolt, stud and nut assemblies 68 used to fasten drums 62 to the hubs. Each wheel hub 66 is rotatably supported on its respective spindle 22 by roller thrust bearings 78 and 80 and the hub 66 and bearings 78 and 80 are axially maintained in place on spindle 22 between spindle shoulder 82 and nut and lock nut assembly 84 on the threaded end 86 of the spindle. Bearing 78 is disposed on an outer spindle shank portion 88 and bearing 80 is disposed on an inner spindle shank portion 90. An oil seal 92 is held in the inner end of wheel hub 66 and around a spindle shank shoulder 94. A protective cap 96, covering the outer bearing 78 and nut assembly 84, is mounted on the outer end of each wheel hub 66 by bolts 98.

Axle Spindle

Each spindle 22 is formed with an axially disposed through opening 100, the opening portion 102 being forged and extending between an internally finished bore 104, adjacent butt weld 23, and a forged conically convergent portion 106. The conical forged portion 106 terminates at through pierced portion 108 which extends through to the outer end of spindle 22 where a "Welch" plug closure element 110 is held in a machined end counterbore 112.

Figure 6:
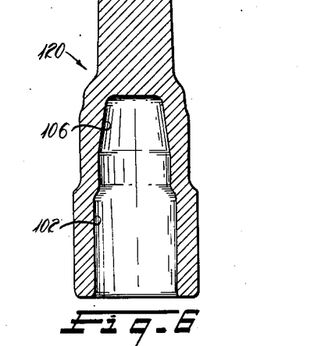
FIGURE 6 is a section through a rough spindle forging after upsetting and before piercing.

In forming spindle 22, a rough alloy steel spindle blank is initially upset by known methods to provide an upset spindle forging 120, FIGURE 6. Spindle forging 120 is then processed through a hot piercing operation in accord with this invention to form the through pierced and extruded end spindle forging 122 shown in FIGURE 7, which piercing operation can be accomplished through use of equipment such as illustrated in FIGURES 8 through 12. The equipment and method will be hereinafter described.

The pierced spindle forging 122 although essentially the shape desired for attachment to the seamless center tube 21, as shown by spindles 22 in FIGURE 5, requires machining to its final form before being butt welded to center tube 21. In welding abutting sections of generally tubular shape, it is requisite for a proper weld that the wall thickness of the abutting sections at the position of welding be substantially uniform. In this instance little difficulty is encountered as far as the seamless center tube 21 is concerned. However in the making of the spindles 22, which are to be welded to the tube 21, great care has to be exercised to ensure that the tubular inner end extensions 124 of spindles 22 are of uniform thickness. Accordingly the inner surface of portion 104 of through bore 100 and the outer surface 126 of the spindle inner end extension 124 are coaxially machined to provide a constant thickness tubular extension accurately matching the cross section of center tube 21. Note that the short extent of the inner end portion 104 and the shallow "Welch" plug counterbore at the opposite end of spindle 22 are the only internally machined portions, the major extent of through opening 100 being formed by upset forging and a piercing extrusion which is a form of forging. Because of the forged nature of the opening 100 the metal grain size and forging flow line structure is uninterrupted by internal machining in the vicinity of the wheel bearing supports on the spindle. The spindles 22 thus realize the higher strength of forged steel over machined steel which would result were the through passage bored and reamed or broached, and can be lighter in weight than an equivalent strength machine bored spindle.

The combined spindle flange and brake spider 27 is welded to spindle 22, FIGURE 1, immediately outwardly from the inner end extension 124. To accurately locate the spider 27 on spindle 22 so the desired radial distances of camshaft opening 44 and brake shoe anchor openings 58 are obtained, the center opening 128 and the spindle shank portion 130 are machined to dimensions enabling a close fit. The spider 27 is axially located by jigs and welded at 132 to the spindle 22, FIGURE 1.

Oil ring shoulder 94, inner bearing seat 90, outer bearing seat 88, the threaded end 86 and "Welch" plug counterbore 112 are also machined to provide the finished spindle forging 22. Finished spindles 22 can be shortened by removing a portion of the end extension 124 and the seamless center tube 21 can be made of desired length to obtain different length axles as desired. It is noted that all spindles 22 are finished before being butt welded to the center tube 21. The spider 27 can be welded to the spindle 22 and the spring seats 24, diaphragm unit supports 25 and brake actuating camshaft supports 26 can be welded to the center tube 21 before the spindles are welded to the center tube 21 but the preferred method of assembly is to initially weld spindles 22 and tube 21 as shown in FIGURE 5.

Spindle Piercing Apparatus

Figure 8:
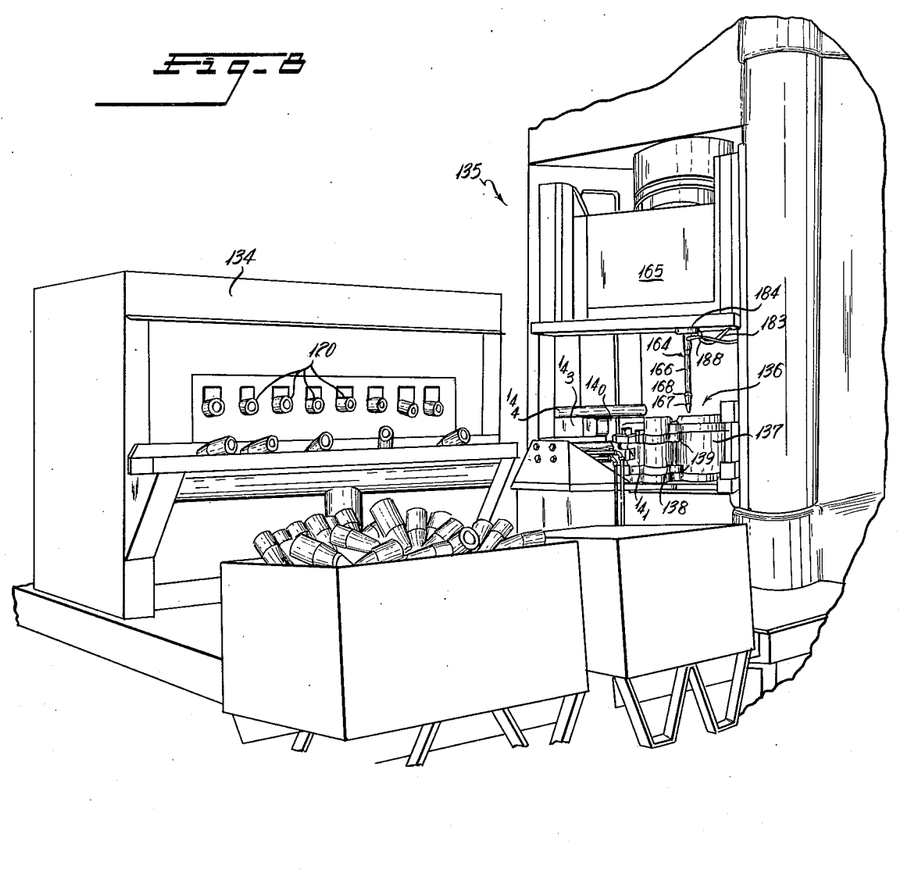
FIGURE 8 shows a box type furnace and the piercing press for heating and piercing the spindle of FIGURES 6 and 7.
Figure 9:
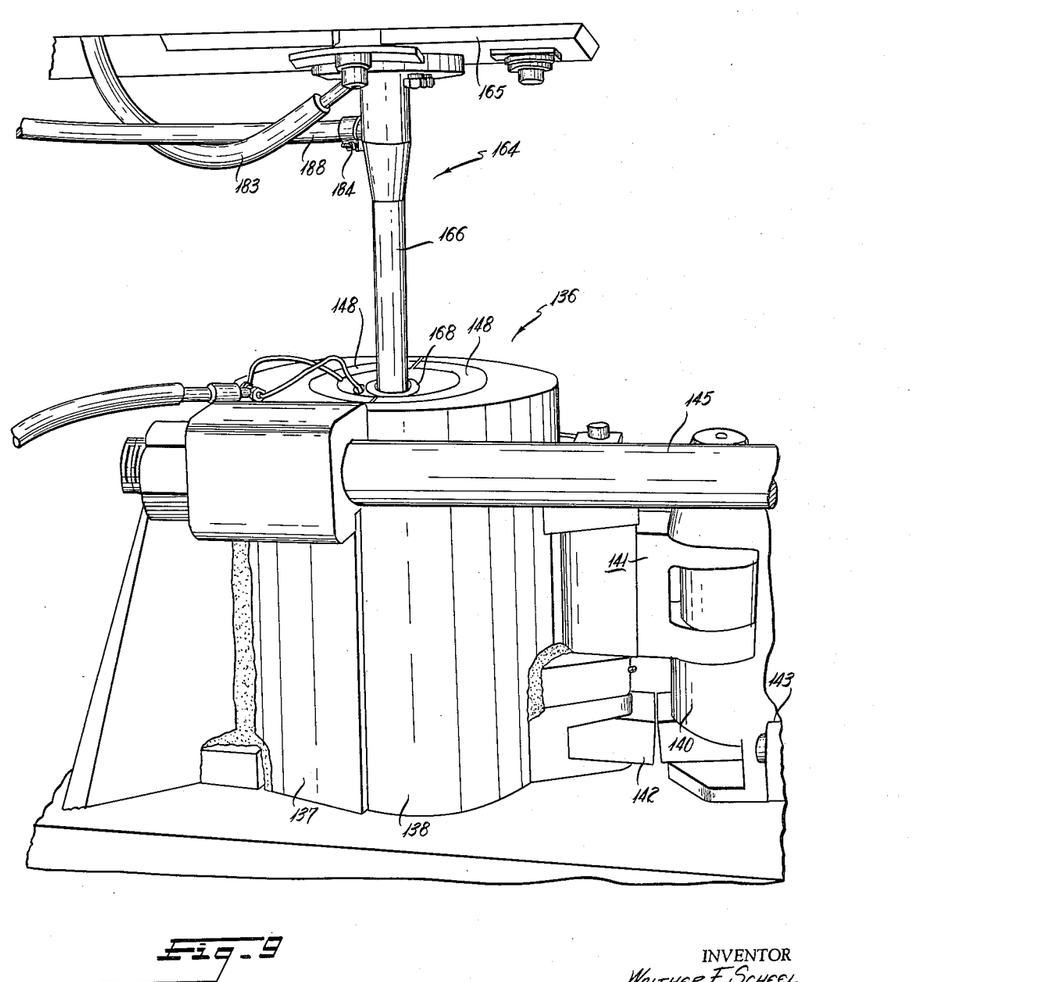
FIGURE 9 shows the closed clamping fixture in the press with the piercer going through a clamped hot spindle forging.

In carrying out the hot piercing of rough spindle forgings 120, a furnace 134, FIGURE 8, is required to heat forgings 120 to a temperature in the range of 2200° to 2300° F. Furnace 134 is illustrated as a box type furnace where rough forgings 120 are placed in and removed from the furnace by hand. Since the butt end of forgings 120 is already formed to shape, only the solid end is heated to desired temperature. It is to be understood that other types of furnaces can be used, e.g. the forgings can be placed on a continuous chain feeder belt which has spindle holders moving the pieces through the heating zone. When the temperature is a desired value, the piece can be discharged from the furnace and feeder belt by an air ejector.

After the spindle forging is heated to the desired temperature, an operator transfers the rough forging 120 to a high pressure piercing press 135. An exemplary satisfactory press is a 400 ton press with a speed of 3.72 strokes/minute.

The bed of press 135 is equipped with a fixture assembly 136 which includes a stationary "dead" side 137 and a swinging "live" side 138 (FIGURES 8, 9 and 10), the "live" side 138 being pivotally fastened by hinge 139 to "dead" side 137, which is rigidly secured to the bed of press 135. A hydraulically operated reciprocating member 140 (FIGURE 8) is hinged to the "live" head by a link 141, and a locking knuckle 142 is moved into locking position when the operating member 140 moves to swing the "live" side 138 about hinge 139 into engagement with "dead" side 137. Operating member 140 is guided in a track 143 in a stationary support 144 fixed to the press bed and connected to the "dead" side of fixture 136 by a tie bar 145.

Figure 10:
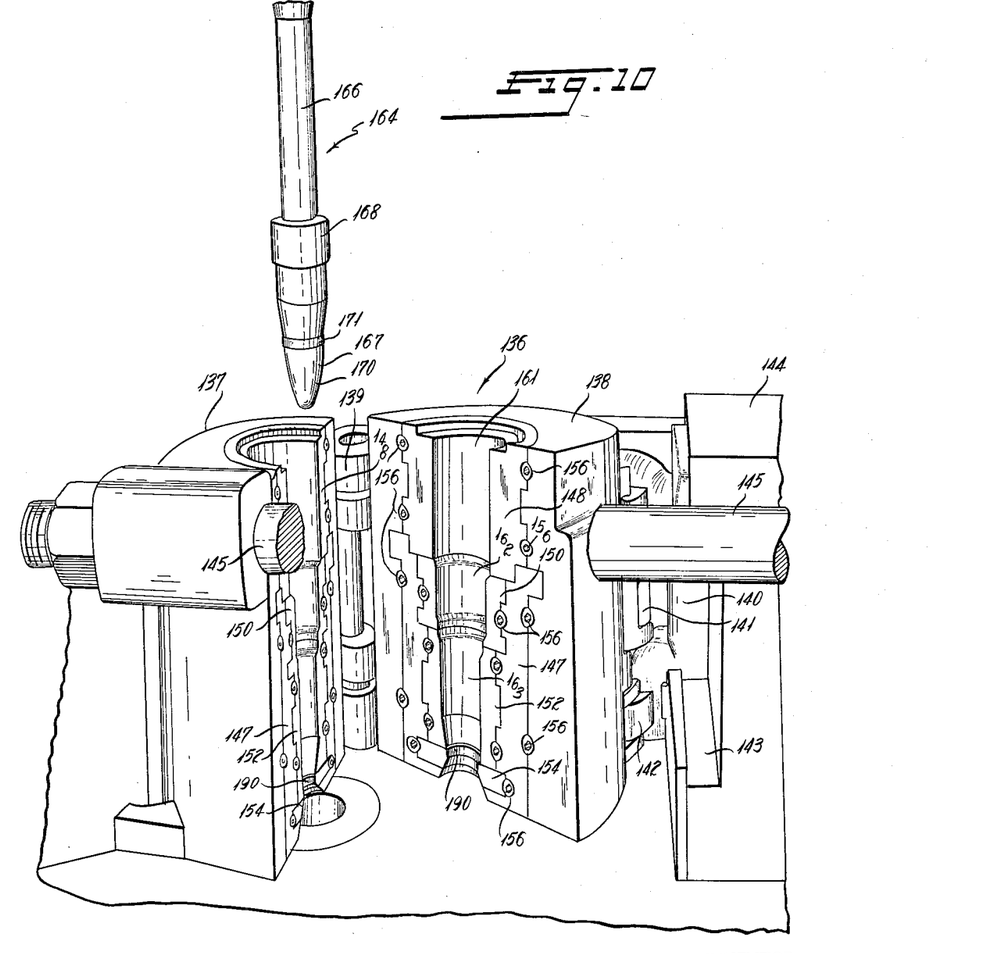
FIGURE 10 shows the spindle clamping fixture of the piercing press, the fixture being open and the piercer guide bushing being positioned adjacent the punch tip.
Figures 11, 12:
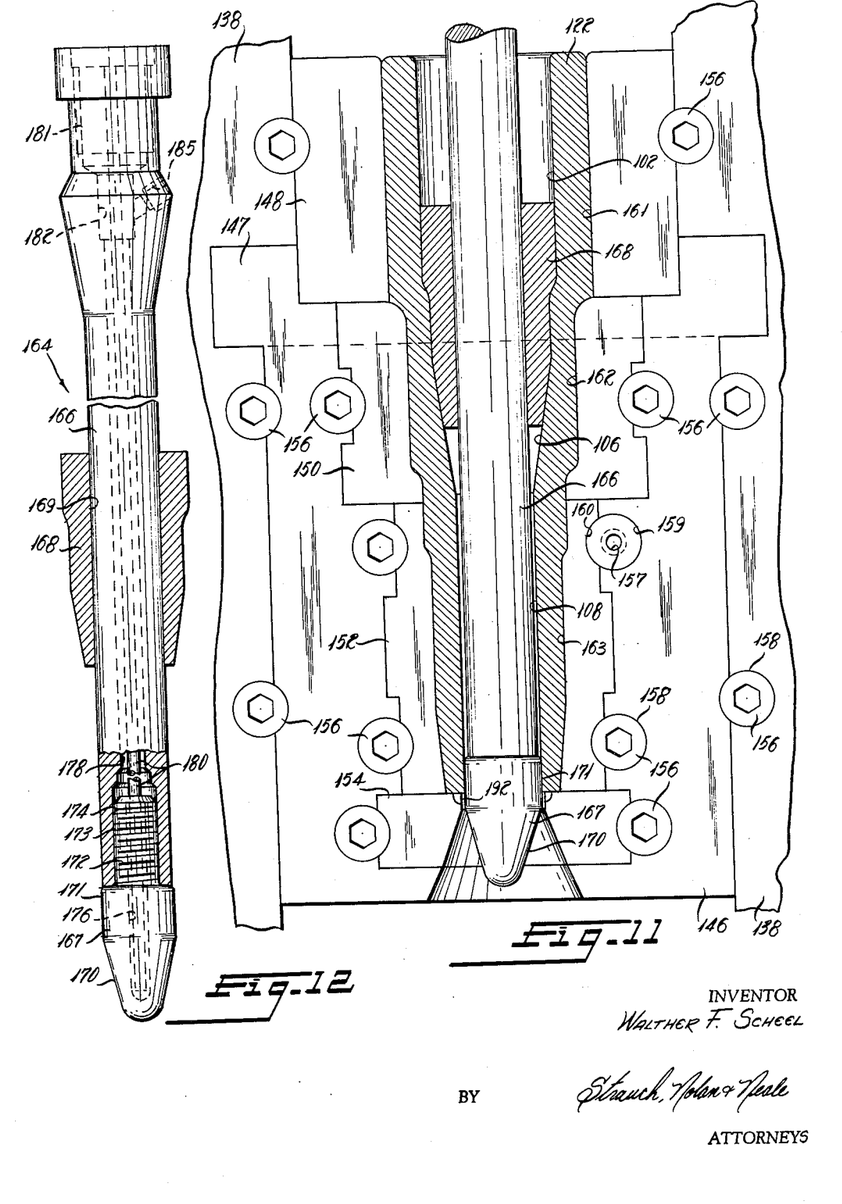
FIGURE 11 shows a side view of a main clamping fixture half insert with typical half die inserts and a shearing insert clamped therein and a sectioned spindle forging, a sectioned guide sleeve and piercer just after completion of the piercing stroke.
FIGURE 12 shows a side view, partially sectioned, of a piercer with its shank guide, punch tip and cooling structure.

Each of "dead" side 137 and "live" side 138 of fixture assembly 136 contain one half of a main insert 147, see FIGURES 10 and 11, and such other spindle shape inserts as half inserts 148, 150 and 152 and a lowermost shearing half insert 154. The spindle shape and shearing half inserts 150, 152 and 154 are held in the main half inserts 147 by socket headed screws 156 which are engaged in threaded openings 157 in main insert 147.

Heads 158 of screws 156 are received in counterbore section 159 of main half insert 147 and overlap into counterbore sections 160 of half inserts 150—154. Half inserts 148 and main clamping fixture half inserts 147 are held in the two fixture sides 137 and 138 of the fixture assembly 118 in substantially the same way in which half inserts 150—154 are held in main half inserts 147. Bores 161 and 162 of respective half inserts 148 and 150 are shaped to provide a snug clamping fit around the upset portion of a spindle forging 120 (FIGURE 6) while the solid end portion of spindle forging 120 will be enabled to extend down into the bore 163 of half inserts 152.

A piercer assembly 164, FIGURE 12, is fastened to the movable head 165 of piercing press 135 and includes a punch shank 166, a piercer punch tip 167 fixed on the end of mounting shank 166, and an annular shank guide 168, with through opening 169, disposed with a sliding fit on punch shank 166. The dimensions of piercer punch tip 167 are such as to allow for shrinkage of metal in spindles 122, upon cooling, to a proper forged finish. The degree of convergence of the conical end portion 170 of punch tip 167 as well as the diameter of the punch tip land section 171 may be varied dependent upon the required diameter of the through pierced opening section 108 in the finished spindles 22 called for by the specification of the assembled axle. A stem 172 of punch tip 167 has a threaded end portion 173 for securing engagement in threaded opening 174 of mounting shank 166.

A blind bore 176 is provided within the punch tip 167 from end 173 and constitutes a continuation of an axial through passage 178 mounting shank 166. A tube 180 secured at the top of mounting shank 166 in a packing assembly 181 projects through a small chamber 182 at the upper end of passage 178, through the passage 178 and into blind bore 176 in punch tip 167 to a position adjacent to the bottom of blind bore 176 and provides for an internal flow of coolant such as water to cool punch tip 167. Shown in FIGURE 9, the water enters through an inlet line 183 connected to a fitting 184 on the movable head of the presss, thence into the top end of tube 180, through tube 180 into the bottom of punch tip 167. The return path is upward in tip bore 176 and shank passage 178 on the outside of tube 180 to chamber 182 and out through side outlet opening 185 which has attached thereto a pipe fitting 186 and line 188.

The exterior shape of shank guide 168 is formed to register with and bear snugly against inner portions in forged spindles 120, such as forged opening portion 102 and/or the forged convergent conical portion 106 prior to any actual piercing action by punch tip 167. Thus the shank guide 168 can enter the forging and provide a radially rigid bushing for the shank 166 during actual piercing of the forging 120.

*Piercing and Extruding*

Figure 7:
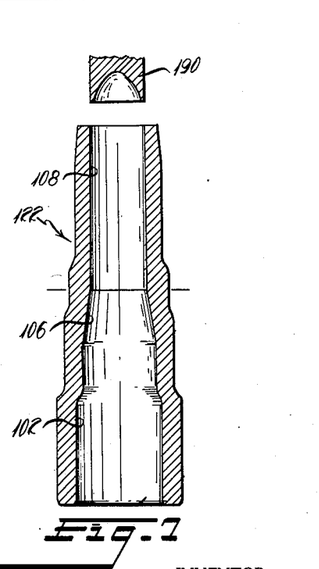
FIGURE 7 is a section through a spindle forging after the rough forging of FIGURE 6 has been subjected to the piercing operation according to this invention.

The piercing and extruding operational steps for transforming the spindle forging 120 of FIGURE 6 to the through pierced spindle forging 122 of FIGURE 7 are as follows:

An upset spindle forging 120 with forged opening portion 102 and forged conical portion 106 is heated in furnace 134 to approximately 2200° to 2300° F. The piercing press operator then places the heated spindle forging 120 in fixture assembly 136 and by means of a suitable control such as a foot valve (not shown), actuates a hydraulic cylinder to move operating member 140 forward to close and lock the "live" side 138 of fixture 136 to the "dead" side 137. After the hot spindle forging 120 is locked in fixture assembly 136 the operator actuates press controls (not shown) which start the downward thrust of piercing assembly 164 toward the hot spindle forging, forcing the punch tip 167 through the hot spindle forging 120, piercing and extruding as it goes. When the point of punch tip 167 engages the base of conical portion 106 and move on through the spindle 120 it forces and forges the metal ahead and to the sides filling the inner bore of the half inserts such as the lower inserts 152. Excess metal forced ahead of punch tip 167 is sheared off in the form of a plug 190 (FIGURE 7) as the land section 171 of tip 167 passes the bottom shearing inserts 154. The inner diameter of the shearing surface 192 of shearing inserts 154 is slightly larger (approximately 1/32 inch) than the outer diameter of tip land section 168 to enable a shearing action as piercing tip 167 passes through the shearing inserts 154.

After the spindle forging 120 has been pierced and extruded to the lengthened and through pierced spindle forging 122 of FIGURE 7, the movable head 165 of piercing press 135 reverses and moves back to its starting point. The operator then actuates the hydraulic cylinder control (referred to above) to release the pierced and extruded spindle forging 122 by unlocking and opening the fixture assembly "live" side 138, which clears and enables removal of the spindle forging 122.

At the start of a spindle forging run the piercer assembly 164, which is mounted to the movable press head 165, is centered to the first spindle forging and then locked in place. When the downward thrust of punch tip 167 has started, shank guide 168 is carried along with punch tip 167 until it is in snug registry with forged opening portion 102 and bears against forged conical portion 106. Thereafter as punch 167 and punch shank 166 continue the downward thrust, shank guide 168 remains in registry giving guide support to punch shank 166 closely adjacent the portion of forging 120 being pierced as the punch tip 167 is forced through the hot metal. When the press ram reverses, the punch tip 167 engages the shank guide 168 and carries guide 168 out of the forged spindle 122.

By providing appropriately shaped inserts in lieu of inserts 148 and 152, upset forgings with integral flanges can be inserted in fixture assembly 136 and subjected to the hot piercing operation, however spindles with integral flanges and separate spiders attached thereto are heavier than the aforedisclosed spindles 22.

From the foregoing it is apparent there is hereby provided a new improved strengthened and lightened non-driving tubular axle assembly. The invention provides forged, pierced and extruded axle spindles which are butt welded to the ends of a tubular axle center section. It provides both the apparatus and method for piercing and extruding axle spindles, including the piercing tip and tip mounting shank guide means which gives aligned guiding support to the tip and tip mounting shank as the tip is being thrust through spindle forging metal.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is to be claimed and desired to be secured by United States Letters Patent is:

1. A non-drive axle and wheel assembly comprising: a seamless tubular mid-section of substantially uniform cross-section and wall thickness; forged axially through pierced spindle elements having tubular upset cylindrical extensions matching and butt-welded to the ends of said mid-section and each having a peripheral machined brake spider seating surface; each of said spindle elements being formed with an internally and externally machined portion adjacent the butt-weld, a succeeding portion forged with an aligned passageway and a successive pierced extruded portion having axially spaced apart peripheral machined bearing mounting surfaces, the three successive portions being adjoining to provide a through opening from one end of said spindle element to the other end with said through opening being larger at the end adjacent to the butt-weld than at the opposite outer end of the spindle; a combined spindle flange and brake spider unit welded to each of said spindle elements and having a machined internal cylindrical surface abutting its respective seating surface on each spindle element; bearings disposed in spaced relation on each of said bearing mounting surfaces; a wheel hub rotatably mounted on said bearings on each spindle element; wheel assemblies on each wheel hub; a brake drum mounted on each wheel hub; a brake assembly including pivoted shoes mounted on each said brake spider unit for controlled braking engagement with respective brake drums; brake actuating motors rigidly mounted on the axle; camshafts mounted on the axle and extending through and rotatably supported by a respective spider unit, each camshaft having a brake shoe actuating cam disposed to engage and move said brake shoes to braking engagement with said brake drum and means connecting said brake actuating motors and respective camshafts.

2. A non-drive axle and wheel assembly comprising: a seamless tubular mid-section of substantially uniform cross-section and wall thickness; forged axially through pierced spindle elements having tubular upset cylindrical extensions matching and butt-welded to the ends of said mid-section and each having a peripheral machined brake spider seating surface; each of said spindle elements being formed with an internally and externally machined portion adjacent the butt-weld, a succeeding portion forged with an aligned passageway and a successive pierced extruded portion having axially spaced apart peripheral machined bearing mounting surfaces, the three successive portions being adjoining to provide a through opening from one end of said spindle element to the other end with said through opening being larger at the end adjacent to the butt-weld than at the opposite outer end of the spindle; brake actuating unit supports welded to the mid-section; brake actuating camshaft supports welded to said mid-section; a combined spindle flange and brake spider unit welded to each of said spindle elements and having a machined internal cylindrical surface abutting its respective seating surface on each spindle element; bearings disposed in spaced relation on each of said bearing mounting surfaces; a wheel hub rotatably mounted on said bearings on each spindle element; wheel assemblies on each wheel hub; a brake drum mounted on each wheel hub; a brake assembly including pivoted shoes mounted on each brake spider unit for controlled braking engagement with respective brake drums; a brake actuating unit mounted on each actuating unit support; a brake actuating camshaft for each brake assembly with a brake shoe actuating cam disposed to engage and move said brake shoes to braking engagement with said brake drum, each of said camshafts being rotatably supported by a respective camshaft support and by a respective brake spider; and means connecting said actuating units and respective camshafts.

References Cited in the file of this patent

UNITED STATES PATENTS

| | | |
|---|---|---|
| 1,219,153 | Reissner | Mar. 13, 1917 |
| 1,286,687 | McGary | Dec. 3, 1918 |
| 2,019,811 | Graham | Nov. 5, 1935 |
| 2,085,796 | Fritsch | July 6, 1937 |
| 2,133,091 | Gettig | Oct. 11, 1938 |
| 2,178,350 | Spatta | Oct. 31, 1939 |
| 2,287,009 | Alden | June 22, 1942 |
| 2,560,973 | Martin et al. | July 17, 1951 |
| 2,569,248 | Miller | Sept. 25, 1951 |
| 2,599,706 | Friedman | June 10, 1952 |
| 2,611,656 | Vanderberg | Sept. 23, 1952 |
| 2,674,783 | Schneider | Apr. 13, 1954 |
| 2,726,560 | Roux | Dec. 13, 1955 |
| 2,831,731 | Buckendale | Apr. 22, 1958 |